United States Patent
Sugimoto et al.

(10) Patent No.: US 9,183,764 B2
(45) Date of Patent: Nov. 10, 2015

(54) METHOD FOR MANUFACTURING THREE-DIMENSIONAL MOLDED MODEL AND SUPPORT TOOL FOR MEDICAL TREATMENT, MEDICAL TRAINING, RESEARCH, AND EDUCATION

(75) Inventors: Maki Sugimoto, Hyogo (JP); Takeshi Azuama, Hyogo (JP); Kinichi Watanabe, Hyogo (JP); Shukichi Shimada, Hyogo (JP)

(73) Assignees: NATIONAL UNIVERSITY CORPORATION KOBE UNIVERSITY, Hyogo (JP); FASOTEC CO., LTD., Chiba (JP)

( * ) Notice: Subject to any disclaimer, the term of this patent is extended or adjusted under 35 U.S.C. 154(b) by 183 days.

(21) Appl. No.: 13/823,652

(22) PCT Filed: Mar. 30, 2012

(86) PCT No.: PCT/JP2012/002211
§ 371 (c)(1),
(2), (4) Date: Apr. 17, 2013

(87) PCT Pub. No.: WO2012/132463
PCT Pub. Date: Oct. 4, 2012

(65) Prior Publication Data
US 2014/0017651 A1   Jan. 16, 2014

(30) Foreign Application Priority Data
Mar. 31, 2011   (JP) .................................. 2011-078876

(51) Int. Cl.
*G06F 19/00*   (2011.01)
*G06K 9/00*   (2006.01)
(Continued)

(52) U.S. Cl.
CPC ............ *G09B 23/30* (2013.01); *B29C 67/0059* (2013.01)

(58) Field of Classification Search
CPC ........ B33Y 50/00; B33Y 50/02; B33Y 80/00; G06T 17/00; G06T 19/00; G09B 23/306; B29C 67/0051; B29C 67/0088; B29C 67/0059; B29C 67/0092
USPC .......................... 700/117, 118, 119; 382/131
See application file for complete search history.

(56) References Cited

U.S. PATENT DOCUMENTS 5,768,134 A * 6/1998 Swaelens et al. ............. 700/121
6,464,639 B1 * 10/2002 Kim et al. ..................... 600/443
(Continued)

FOREIGN PATENT DOCUMENTS

JP          05-011689       1/1993
JP       2003-011237 A      1/2003
(Continued)

OTHER PUBLICATIONS

How 3-D Bioprinting Works—HowStuffWorks; by William Harris; 4 pages; printed from Internet on May 11, 2015.*
(Continued)

*Primary Examiner* — Ronald Hartman, Jr.
(74) *Attorney, Agent, or Firm* — Ogilvie Law Firm

(57) ABSTRACT

Provided is a method for manufacturing a three-dimensional molded model that can reproduce the feel of an organ. A three-dimensional shape of a body site subject to molding is extracted from brightness information of two-dimensional data obtained from medical diagnostic devices, and three-dimensional molding data of the body site and the internal structure site thereof is created. The three-dimensional shape data is edited using a modeling function. Respective touch equivalent parameter tables are created. The material type and the formulation ratio of the modeling material used for molding each body site and internal structural site are defined, and added to the touch equivalent parameter tables. Primitive shape data is generated from the parameters of the touch equivalent parameter tables, and a Boolean operation is performed on the body site data and internal structure site data as well as on the primitive shape data. Molding is performed using the defined materials.

20 Claims, 10 Drawing Sheets

(51) Int. Cl.
*G09B 23/30* (2006.01)
*B29C 67/00* (2006.01)

(56) References Cited

U.S. PATENT DOCUMENTS

| | | | |
|---|---|---|---|
| 7,371,400 B2 * | 5/2008 | Borenstein et al. | 424/423 |
| 7,718,109 B2 * | 5/2010 | Robb et al. | 264/308 |
| 7,758,792 B2 * | 7/2010 | Yamazawa et al. | 264/308 |
| 8,260,589 B1 * | 9/2012 | Kumar | 703/2 |
| 8,369,925 B2 | 2/2013 | Giesel et al. | |
| 8,579,620 B2 * | 11/2013 | Wu | 425/7 |
| 8,639,484 B2 * | 1/2014 | Sun et al. | 703/11 |
| 8,691,974 B2 * | 4/2014 | Gatenholm et al. | 536/56 |
| 9,011,754 B2 * | 4/2015 | Leong et al. | 264/465 |
| 2002/0182241 A1 * | 12/2002 | Borenstein et al. | 424/422 |
| 2006/0249875 A1 * | 11/2006 | Robb et al. | 264/239 |
| 2007/0118243 A1 * | 5/2007 | Schroeder et al. | 700/118 |
| 2007/0218544 A1 * | 9/2007 | Ying et al. | 435/287.2 |
| 2010/0047752 A1 * | 2/2010 | Chan et al. | 434/272 |
| 2010/0128033 A1 * | 5/2010 | Stevens et al. | 345/420 |
| 2010/0240117 A1 * | 9/2010 | Ying et al. | 435/284.1 |
| 2011/0015530 A1 | 1/2011 | Misawa | |
| 2011/0136162 A1 * | 6/2011 | Sun et al. | 435/29 |
| 2011/0250688 A1 * | 10/2011 | Hasan | 435/395 |
| 2012/0190078 A1 * | 7/2012 | Gatenholm et al. | 435/101 |
| 2012/0224755 A1 * | 9/2012 | Wu | 382/131 |
| 2015/0057786 A1 * | 2/2015 | Murphy et al. | 700/119 |

FOREIGN PATENT DOCUMENTS

| | | |
|---|---|---|
| JP | 3613568 B2 | 1/2005 |
| JP | 2006-343434 A | 12/2006 |
| WO | 2005/037529 | 4/2005 |
| WO | 2009/119908 | 10/2009 |

OTHER PUBLICATIONS

3D Bioprinting of human transplant organs—A patent landscape; researched by Hohsan Alvi and Mathew Duckett for Coller IP; prepared by Robert Gleave; Jul. 2014; 42 pages; printed from Internet on May 11, 2015.*

* cited by examiner

Fig.6

(1) Models of a liver

| | Internal structure pattern | Pattern size | Pattern interval | Resin which is used | |
|---|---|---|---|---|---|
| | | | | Resin A | Resin B |
| Hepatic parenchyma | Cube | 1.5mm | 0.5mm | 1 | 0 |
| Hepatic vein | Sphere | 1mm | 1.5mm | 0 | 1 |
| Portal vein | Sphere | 1mm | 1mm | 3 | 1 |

(2) Model of a liver cross-section

| | Internal structure pattern | Pattern size | Pattern interval | Resin which is used | |
|---|---|---|---|---|---|
| | | | | Resin A | Resin B |
| Hepatic parenchyma | Cube | 1.5mm | 0.5mm | 1 | 0 |
| Hepatic vein | Sphere | 1mm | 1.5mm | 0 | 1 |
| Portal vein | Sphere | 1mm | 1mm | 3 | 1 |

(3) Model of a liver cancer

| | Internal structure pattern | Pattern size | Pattern interval | Resin which is used | | Support material |
|---|---|---|---|---|---|---|
| | | | | Resin A | Resin B | |
| Hepatic parenchyma | Cube | 1.5mm | 0.5mm | 1 | 0 | — |
| Hepatic vein | Sphere | 1mm | 1.5mm | 0 | 1 | — |
| Portal vein | Sphere | 1mm | 1mm | 3 | 1 | — |
| Cancer part | Cube | 1mm | 1mm | — | — | 1 |

Fig.7
(1) Bone (normal bone)
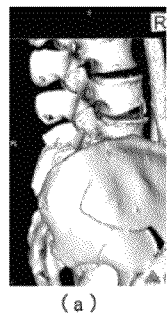
(a)
| | Internal structure pattern | Pattern size | Pattern interval | Resin which is used | |
|---|---|---|---|---|---|
| | | | | Resin A | Resin B |
| Bone | cube | 1.5mm | 1mm | / | / |
(b)
(2) Bone (osteoporotic bone)
(c)
| | Internal structure pattern | Pattern size | Pattern interval | Resin which is used | |
|---|---|---|---|---|---|
| | | | | Resin A | Resin B |
| Bone | cube | 4mm | 0.5mm | / | / |
(d)

(a) (b) (c)

METHOD FOR MANUFACTURING THREE-DIMENSIONAL MOLDED MODEL AND SUPPORT TOOL FOR MEDICAL TREATMENT, MEDICAL TRAINING, RESEARCH, AND EDUCATION

TECHNICAL FIELD

The present invention relates to a technique of forming a three-dimensional molded model with multiple types of materials based on three-dimensional digital data of a medical image obtained from a medical diagnostic apparatus such as X-ray CT or MRI.

BACKGROUND ART

In the field of medicine, there is a growing need for three-dimensional visualization of affected parts and/or specific body parts in the processes of, for example, informed consent, decision on courses of treatment, medical education, and medical research. In particular, in the case of three-dimensional visualization utilizing a three-dimensional molded model, not only the sense of vision but also the sense of touch of the actual three-dimensional geometry allows transmission of a large amount of information that cannot be transmitted completely through computer images.

There has conventionally been known creating three-dimensional geometry data using DICOM (Digital Imaging and Communications in Medicine), a standard for medical diagnostic apparatuses such as X-ray CT and MRI (Magnetic Resonance Imaging), and based on the data, producing a three-dimensional molded model for medical use rapidly and precisely with a plaster-based material using a powder-laminating molding machine.

There have, however, been problems that the softness of complex organs, such as a liver, having an internal structure cannot be simulated and that information on the feeling of touch of an organ or the like cannot be provided to doctors and/or nurses handling organs, etc.

Combinations and collaborations between medical services and engineering having been rapidly developing, there has recently been proposed a simulator program utilizing an advanced engineering calculation method. The simulator program is arranged to reconstruct body parts to be operated polygonally on a computer screen to simulate the surface of an organ such as a liver.

Meanwhile, there has been known a three-dimensional printer with which a three-dimensional molded model using hard and flexible resins having their respective different mechanical properties can be produced by simultaneously forming jets of the resins and combining them. With such a three-dimensional printer, it is possible to reproduce not only the surface but also the internal structure of the target form structure. However, there are only a few such printers that can reproduce the flexibility of complex organs, such as a liver, having an internal structure or the hardness of bones and the like.

As a related art, there has been proposed a three-dimensional molded object production method with which a multicolor and multi-material three-dimensional object having a complex structure and also having different hardness at different parts thereof can be molded by holding and fixing multiple types of model materials in one layer at their respective molding positions in a holder sheet having a web structure in which molding model materials can be held, placing a next-layer holder sheet on the fixed layer of the model materials, holding and fixing multiple types of next-layer model materials at their respective molding positions in the next-layer holder sheet, repeating fixing model materials sequentially to upper layers, and after laminating the layers, solving and removing the holder sheets (see Patent Document 1). However, the method disclosed in Patent Document 1 requires hard or soft model materials so that different parts have different hardness accordingly.

[Patent Document 1] WO2005/037529

OUTLINE OF THE INVENTION

Problems to be Solved by the Invention

The main purpose of using conventional three-dimensional molded models has been to determine the geometry. Product designers have demanded high-precision molded models with which even smooth geometries and detailed parts can be reproduced. It is however difficult to imagine the feeling of touch and/or the feeling of use only from the geometry. What is needed is a molded model not only having geometry but also providing a feeling of touch, feeling of use, texture, etc., approximate to those of the actual object.

Under the circumstances described above, it is an object of the present invention to provide a three-dimensional molded model production method with which multiple types of materials can be produced into another material having different mechanical properties and, by thus combining materials, feeling of touch of an organ or the like that professionals including physicians have can be reproduced using a three-dimensional printer with which a three-dimensional molded model can be produced.

Means to Solve the Objects

In order to achieve the foregoing object, the present invention provides a method for producing a three-dimensional molded model using a three-dimensional printer that uses at least two types of materials as model materials, the method including at least the steps of:

1) extracting a three-dimensional geometry of a body part to be molded from brightness information of two-dimensional data obtained from a medical diagnostic apparatus and creating three-dimensional geometry data of the body part and an internal structural part thereof;

2) editing the three-dimensional geometry data of the body part and the internal structural part thereof using a modeling feature;

3) preparing a feeling equivalence parameter table including, as parameters, at least an internal structure pattern, a pattern size, and a pattern interval that specify a primitive geometry of the body part and the internal structural part;

4) defining the types and the blend ratio of model materials and the types of support materials used for molding for each of the body part and the internal structural part and adding the types and the blend ratio to the feeling equivalence parameter table;

5) creating primitive geometry data with parameters in the feeling equivalence parameter table and performing a Boolean operation of either logical sum, logical difference, or logical product between part data of the body part and the internal structural part obtained in the preceding step 2) and the primitive geometry data; and 6) performing molding with the three-dimensional printer using the materials defined in the preceding step 4) based on the three-dimensional geometry data of the body part and the internal structural part obtained in the preceding step 5).

Here, the medical diagnostic apparatus may be a CT, an MRI, or a PET (Positron Emission Tomography) machine and is arranged to extract a three-dimensional geometry of a body part to be molded from brightness information of two-dimensional data using DICOM (Digital Imaging and Communications in Medicine), a standard for medical digital image format and communications protocol.

Here, MRI images have a higher resolution of soft tissues than CT images, with which the physical property value of many tissues can be obtained. PET is mainly used for cancer diagnoses or the like and PET images are utilized with CT/MRI images to produce a three-dimensional molded model of a cancerous organ. CT images, MRI images, or PET images, or a combination thereof may be used. One may be for the contour of a body part, while the other may be for tissue images of an internal structural part.

The step 1) includes extracting a three-dimensional geometry of a body part to be molded from brightness information of two-dimensional data obtained from a medical diagnostic apparatus and creating three-dimensional geometry data of the body part and an internal structural part thereof. The medical diagnostic apparatus provides dot information of tomographic images including DICOM-format brightness information, and the tomographic images are overlaid to extract a three-dimensional geometry of a body part to be molded. Further, commercially-available three-dimensional image CAD software is used to create three-dimensional geometry data of the body part and the internal structural part thereof. The three-dimensional geometry data of the body part and the internal structural part thereof created using the three-dimensional image CAD software undergoes adjustment of the patch surface orientation, removal of unnecessary shells, supplement of gaps, patch reduction, and smoothing of the contour geometry to thereafter be stored in, for example, an STL (Standard Triangulated Language) data format.

Next, the step 2) includes editing the three-dimensional geometry data created in the preceding step 1) using a modeling feature. Here, the modeling feature, which is included in commercially-available three-dimensional image CAD software, includes preparing a cross-section (including partial cross-section) geometry, preparing a plane, a curved surface, and/or a primitive geometry, geometry cutting, adding a sign/character, and adding a marking symbol, etc.

The step of editing geometry data preferably includes at least one of character/sign addition processing, marking symbol addition processing, scaler addition processing, and barcode addition processing. The three-dimensional molded model is intended to be utilized in the field of medicine for three-dimensional visualization of affected parts and/or specific body parts in the processes of, for example, informed consent, decision on courses of treatment, medical education, and medical research. Addition processing of a character/sign to the three-dimensional geometry data allows patient's personal information and/or imaging date to be added to the three-dimensional molded model as character information. Addition processing of a marking symbol to the three-dimensional geometry data allows information useful for informed consent and/or decision on courses of treatment to be added to the three-dimensional molded model. Also, addition processing of a scaler to the three-dimensional geometry data allows information useful for decision on courses of treatment and/or actual operations to be added to the three-dimensional molded model. Moreover, addition processing of a barcode to the three-dimensional geometry data allows a patient's information to be added to the three-dimensional molded model.

Next, the step 3) includes preparing a feeling equivalence parameter table for each of the body part and the internal structural part. Here, the feeling equivalence parameter table includes information data for use in reproducing the feeling of touch of the body part and the internal structural part. Specifically, the feeling equivalence parameter table defines an internal structure pattern, a pattern size, and a pattern interval that specify a primitive geometry.

The body part represents living tissues of not only humans and animals but also plants. For example, in the case of humans, the body part includes an organ such as a liver and a heart, and otherwise includes an organ of a pet, such as dogs and cats, and further a plant fruit. The internal structural part represents structural parts inside living tissues, including bone, fat, blood vessel, etc.

Defining an internal structure pattern that specifies a primitive geometry means defining the identification number of a primitive geometry such as a cylinder or a rectangular parallelepiped as an internal structure. Here, the primitive geometry may be a geometrically basic one such as a cylinder, an elliptic cylinder, a rectangular parallelepiped, a cube, a polygonal column, a sphere, a wedge, a pyramid, or a cone or may be an applied one such as a combination of basic geometries or a unique geometry.

Defining a pattern size means defining the size of a primitive geometry, for example, the radius of a sphere, the height, width, and thickness of a rectangular parallelepiped. Defining a pattern interval means defining the arrangement intervals of primitive geometries, for example, the distance between the centers of gravity or the side surfaces of adjacent primitive geometries.

Next, the step 4) includes defining the types and the blend ratio of model materials used for molding for each of the body part and the internal structural part and adding the types and the blend ratio to the feeling equivalence parameter table.

Here, the materials may preferably include some resins, such as hard resin and flexible resin. Without being limited to resin, plaster powder, plastic powder, metal powder, or wax may be used. For example, assuming using resin for the materials, it is not possible to freely select any resin(s) which can be used due to limitations of the three-dimensional printer that performs three-dimensional molding. To address this problem, the blend ratio of the materials is defined so that some resins can be blended.

The model materials are molding materials forming the three-dimensional molded model. The support materials are for supporting the model materials during molding. The model materials include various characteristics such as translucency, color, flexibility, and stiffness. On the other hand, the support materials should be removed easily after being hardened. An ultrasonic cleaner and/or solution may be used to remove support materials from the molded object. Acrylic resins, for example, are preferably used for the model materials and the support materials. In the case of molding an internal structure surrounded by other structure(s), the above-described support materials may be used as the materials for molding the structure.

Defining the blend ratio means, in the case of using a three-dimensional printer capable of simultaneously forming jets of two types of resins serving as model materials, for example, controlling the blend ratio of the resins, whereby intended hardness or softness can be achieved.

At least one type of the model materials is preferably composed of a translucent material. The translucent material causes the internal structure to be see-through, resulting in an improvement in the spatial recognition. This facilitates grasping the internal structure, for which at least one type of the model materials is thus composed of a translucent material to be useful for informed consent, decision on courses of treatment, medical research, and medical education, for example.

Next, the step 5) includes creating primitive geometry data with parameters in the feeling equivalence parameter table and performing a Boolean operation of either logical sum, logical difference, or logical product between part data of the body part and the internal structural part obtained in the preceding step of editing data and the primitive geometry data.

Here, the Boolean operation is an approach for molding with three-dimensional computer graphics and CAD through a set operation of sum, difference, and/or product between geometries with volume. Logical sum is an operation in which a geometry is integrated with another geometry. Logical difference is an operation in which a geometry trims another geometry. Logical product is an operation in which a portion of a geometry overlapped with another geometry is left.

The present invention is characterized by defining feeling equivalence parameters such that the hardness of materials used in a molded model is approximate to the feeling of touch of the actual object and performing a Boolean operation according to the parameters to define a material providing a feeling of touch approximate to that of the actual object.

Next, the step 6) includes performing molding with the three-dimensional printer using the materials defined in the preceding step of defining the material types based on the three-dimensional geometry data of the body part and the internal structural part obtained in the preceding Boolean operation step.

The three-dimensional printer is arranged to mold a three-dimensional object with an inkjet ultraviolet curing method using acrylic photo-curable resin, a fused deposition method using ABS resin, or a powder fixing method using powder, though not limited thereto. Various methods may be employed as long as they are capable of molding a three-dimensional object using multiple types of materials.

The materials used as model materials are preferably selectable from a variety of materials with which parameters can be controlled, such as color, optical transparency, high softness, radiotransparency, ultrasonic sensitivity, scintillation sensitivity, heat ray sensitivity, and conductivity.

In the step of creating geometry data in the method for producing a three-dimensional molded model, the three-dimensional geometry size of the internal structural part may be reduced to be smaller than the volume of the internal structural part of the body part, so that only the internal structure can be extracted from the body part. The void resulting from the reduction in the three-dimensional geometry size of the internal structural part may be filled with the support materials during molding and the support materials may be removed after being hardened.

For example, if the body part can be divided into two parts, the internal structure can be extracted separately through the divided faces. This allows the internal structure to be examined separately in more detail.

In the above-described method for producing a three-dimensional molded model according to the present invention, in the case of providing a feeling of softness for at least one of the body part and the internal structural part, the Boolean operation step may include performing a logical sum between the part data defined with a first soft material and the primitive geometry data defined with a second soft material.

The logical sum between the part data defined with a first soft material and the primitive geometry data defined with a second soft material means, for example, adding a rubber-like soft material to another soft material like the support materials. Mixing a primitive geometry that provides a desired feeling of softness and/or cutting/sectioning with a rubber-like model material allows a feeling of touch approximate and equivalent to the actual softness to be reproduced. As mentioned above, the primitive geometry may be selected from various types, that is, may be a geometrically basic one such as a cylinder, an elliptic cylinder, a rectangular parallelepiped, a cube, a polygonal column, a sphere, a wedge, a pyramid, or a cone or may be an applied one such as a combination of basic geometries or a unique geometry. The type, size, number/amount of mixing, and method of mixing of the primitive geometry are adjusted to control the softness and thereby provide the desired feeling of touch.

This is mainly useful for reproducing the feeling of touch of soft tissues such as fat, muscle, and blood vessel.

Alternatively, in the above-described method for producing a three-dimensional molded model according to the present invention, in the case of providing a feeling of softness for at least one of the body part and the internal structural part, the Boolean operation step may include performing a logical difference between the part data defined with a first soft material and the primitive geometry data defined with no material. In the logical difference with the primitive geometry data defined with no material, the support materials are to be automatically assigned to the primitive geometry data. If the part of the primitive geometry is a hermetically-closed internal structure, the support materials cannot be removed due to cleaning and the like. Accordingly, the softness of the support materials is to be added to the nature of the interior of the entire geometry. On the contrary, if the part of the primitive geometry is not a hermetically-closed internal structure, for example, gaps are open in a grid-like manner, the support materials are to be removed due to cleaning and the like, which forms a void at the part of the primitive geometry. This means, for example, subtracting the primitive geometry from a part composed of, for example, a rubber-like soft model material. Subtracting the primitive geometry from a part that provides a desired feeling of softness and/or cutting/sectioning with a rubber-like material allows a feeling of touch approximate and equivalent to the actual softness to be reproduced. The type, size, number/amount of subtraction, and method of subtraction of the primitive geometry to be subtracted are adjusted to control the softness and thereby provide the desired feeling of touch.

This is mainly useful for reproducing the feeling of touch of soft tissues such as fat, muscle, and blood vessel.

Further, in the above-described method for producing a three-dimensional molded model according to the present invention, in the case of providing a feeling of hardness for at least one of the body part and the internal structural part, the Boolean operation step may include performing a logical sum between the part data defined with a first hard material and the primitive geometry data defined with a second hard material.

The logical sum between the part data defined with a first hard material and the primitive geometry data defined with a second hard material means adding a hard molding material with a harder molding material. Mixing a primitive geometry that provides a desired feeling of hardness with a hard molding material allows a feeling of touch approximate and equivalent to the actual hardness to be reproduced. The type, size, number/amount of mixing, and method of mixing of the primitive geometry are adjusted to control the hardness and thereby provide the desired feeling of touch.

This is mainly useful for reproducing the feeling of touch of hard tissues such as bone and feeling of cutting and/or sectioning.

Alternatively, in the above-described method for producing a three-dimensional molded model according to the present invention, in the case of providing a feeling of hardness for at least one of the body part and the internal structural part, the Boolean operation step may include performing a logical difference between the part data defined with a first hard material and the primitive geometry data defined with no material.

The logical difference between the part data defined with a first hard material and the primitive geometry data defined with no material means subtracting a detailed primitive geometry from the interior of a geometry part formed of a hard molding material to reproduce the feeling of touch approximate and equivalent to the actual feeling of cutting/sectioning. The type, size, number/amount of subtraction, and method of subtraction of the primitive geometry to be subtracted are adjusted to control the hardness and thereby provide the desired feeling of touch.

This is mainly useful for reproducing the feeling of touch of hard tissues such as bone and feeling of cutting and/or sectioning.

Next will be described the definition of the internal structure for body parts for which a three-dimensional molded model can be produced and effectively used in particular.

In the step of preparing a table in the above-described method for producing a three-dimensional molded model according to the present invention, if the body part is a liver, one or more of hepatic parenchyma, hepatic vein, portal vein, bile duct, and the affected part may be selected as the internal structural part to define the internal structure pattern, the pattern size, and the pattern interval thereon.

If the body part is a liver, the definition is preferably made on at least hepatic artery, hepatic vein, portal vein, and the affected part. It is more preferable that the definition is made on hepatic parenchyma and bile duct.

In the step of preparing a table in the above-described method for producing a three-dimensional molded model according to the present invention, if the body part is a pregnant abdomen, one or more of uterus, fetus, umbilical cord (navel cord), placenta, amniotic fluid, blood vessel, and subcutaneous fat may be selected as the internal structural part to define the internal structure pattern, the pattern size, and the pattern interval thereon.

Molding reproducing the feeling of touch of a fetus makes it possible to qualify prenatal diagnosis and safety of Cesarean section, and to determine whether or not the fetus can become tangled in the umbilical cord (navel cord) during childbirth, and reconfirm the sequence of childbirth. The produced three-dimensional molded model can also be utilized as a molded album as a memory of the childbirth.

In the step of preparing a table in the above-described method for producing a three-dimensional molded model according to the present invention, if the body part is a breast, one or more of subcutaneous fat, mammary gland, mammary duct, lymph duct, lymph node, and breast cancer part may be selected as the internal structural part to define the internal structure pattern, the pattern size, and the pattern interval thereon. The definition is preferably made on subcutaneous fat, mammary gland, breast cancer part, and lymph duct.

Molding reproducing the feeling of hardness of a breast cancer part can be utilized for training in breast cancer screening as part of medical education and explanation of disease presentation to an actual patient.

In the step of preparing a table in the above-described method for producing a three-dimensional molded model according to the present invention, if the body part is a limb, one or more of skin, subcutaneous fat, artery, vein, muscle, bone, and tendon forming the limb and joints may be selected as the internal structural part to define the internal structure pattern, the pattern size, and the pattern interval thereon.

Molding reproducing the feeling of softness of skin, subcutaneous fat, and blood vessel can be utilized for training of doctors and nurses in injecting and blood sampling.

The produced model can also be utilized as an artificial arm or an artificial leg.

In the step of preparing a table in the above-described method for producing a three-dimensional molded model according to the present invention, if the body part is a throat, one or more of esophagus, trachea, and cartilage may be selected as the internal structural part to define the internal structure pattern, the pattern size, and the pattern interval thereon.

Molding reproducing the geometry and the feeling of touch of esophagus and trachea can be utilized for training of doctors and nurses in inserting an aspirator tube into a patient's body with, for example, pneumonia.

In the step of preparing a table in the above-described method for producing a three-dimensional molded model according to the present invention, if the body part is a face, one or more of skin, subcutaneous fat, muscle, cartilage, bone, and blood vessel may be selected as the internal structural part to define the internal structure pattern, the pattern size, and the pattern interval thereon.

This can be utilized for pre-operation confirmation of a cosmetic surgery.

In the step of preparing a table in the above-described method for producing a three-dimensional molded model according to the present invention, if the body part is a tooth and gum, one or more of tooth, gum, alveolar bone, blood vessel, nerve, jaw bone, jaw muscle, and tongue may be selected as the internal structural part to define the internal structure pattern, the pattern size, and the pattern interval thereon.

In the step of preparing a table in the above-described method for producing a three-dimensional molded model according to the present invention, if the body part is a digestive tract, the inner wall or the outer wall of the digestive tract may be selected as the internal structural part to define the internal structure pattern, the pattern size, and the pattern interval thereon.

In the step of preparing a table in the above-described method for producing a three-dimensional molded model according to the present invention, if the body part is a head, one or more of hair, eyeball, brain, brain blood vessel, skin, subcutaneous fat, muscle, ear cartilage, nose cartilage, and skull may be selected as the internal structural part to define the internal structure pattern, the pattern size, and the pattern interval thereon.

This can be utilized for pre-operation confirmation of a cosmetic surgery.

Another aspect of the present invention provides a support tool for medical treatment, medical training, research, and education, the support tool formed by slicing at a predetermined thickness a three-dimensional molded model obtained by the above-described method for producing a three-dimensional molded model or by overlaying the slices to form the original three-dimensional geometry and passing an axis through the geometry so that the geometry is freely rotatable about the axis.

Slicing the produced three-dimensional molded model and overlaying the slices allows the entire geometry and the cross-section structure to be grasped at the same time, which is useful as a tool for medical care support and medical education.

Another aspect of the present invention provides a support tool for medical treatment, medical training, research, and education, the support tool formed by slicing at a predetermined thickness a three-dimensional molded model obtained by a method for producing a three-dimensional molded model using a three-dimensional printer that uses at least two types of materials as model materials, overlaying the slices to form the original three-dimensional geometry, and passing an axis through the geometry so that the geometry is freely rotatable about the axis, the method including the steps of: extracting a three-dimensional geometry of a body part to be molded from brightness information of two-dimensional data obtained from a medical diagnostic apparatus and creating three-dimensional geometry data of the body part and an internal structural part thereof; editing the three-dimensional geometry data using a modeling feature; defining the types and the blend ratio of model materials used for molding for each of the body part and the internal structural part and adding the types and the blend ratio to the feeling equivalence parameter table; and performing molding with the three-dimensional printer using the materials defined in the preceding step of defining the material types.

Slicing the produced three-dimensional molded model and overlaying the slices allows the entire geometry and the cross-section structure to be grasped at the same time, which is useful as a tool for medical care support and medical education.

Next will be described a program for producing a three-dimensional molded model according to the present invention using a three-dimensional printer that uses at least two types of materials as model materials, the program causing a computer to execute the steps of:

a) extracting a three-dimensional geometry of a body part to be molded from brightness information of two-dimensional data obtained from a medical diagnostic apparatus and creating three-dimensional geometry data of the body part and an internal structural part thereof;

b) editing the three-dimensional geometry data using a modeling feature;

c) prompting an input of feeling equivalence parameters including at least an internal structure pattern, a pattern size, and a pattern interval that respectively specify a primitive geometry of the body part and the internal structural part and generating a feeling equivalence parameter table;

d) prompting an input of the types and the blend ratio of model materials used for molding for each of the body part and the internal structural part and additionally defining the types and the blend ratio to the feeling equivalence parameter table; and e) creating primitive geometry data with parameters in the feeling equivalence parameter table and performing a Boolean operation of either logical sum, logical difference, or logical product between part data of the body part and the internal structural part obtained in the preceding step of editing data and the primitive geometry data.

Causing a computer to execute the steps a) to e) allows molding data of a molded model that provides an approximate feeling of touch to be created utilizing image data obtained from the medical diagnostic apparatus. A three-dimensional molded model that provides an approximate feeling of touch can be produced with a three-dimensional printer by sending three-dimensional geometry data of the body part and the internal structural part obtained in the step e) and material information defined in the step d) to the three-dimensional printer.

Effects of the Invention

In accordance with the present invention, it is possible to produce a molded model providing a feeling of touch equivalent to that of an organ or the like that professionals including physicians have using a three-dimensional printer that uses at least two types of materials as model materials.

The present invention is applicable to, for example, medical care services, in which disease states can be evaluated three-dimensionally with reference to a three-dimensional molded model of organs to make a diagnosis and a decision on courses of treatment as well as to determine the effect of treatment. In particular, the present invention is helpful for pre- and post-operation determination of an area of resection and planning of an operative procedure. The present invention is also useful for learning of diagnostic treatment procedures including operations. Further, in the field of organ transplantation, the present invention is applicable to capacity-dependent procedures with a spare organ, and also utilized for explanation to patients and their families.

In actual surgical operations, operative sites are likely to become visually blocked due to the effects of blood and/or other organs and it is often the case that the operator relies on his/her feeling of touch and/or experience. In such cases, the procedure can be performed at ease by preparing a three-dimensional molded model reproducing the geometry of and the feeling of touch of a patient's body part itself, identifying the geometry of and the feeling of touch of the part to be treated through a doctor's visual confirmation of the molded model, and then actually performing a treatment procedure on the patient.

Furthermore, in the field of medical education, a three-dimensional molded model produced according to the present invention can actually be taken in hand to understand the three-dimensional structure of and the feeling of touch of organs and, in particular, to simulate the feeling of touch.

BRIEF DESCRIPTION OF THE DRAWINGS

FIG. 6 illustrates feeling equivalence parameter tables of three-dimensional molded models of a liver.

FIG. 7 illustrates feeling equivalence parameter tables of three-dimensional molded models of a bone.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Figure 1:
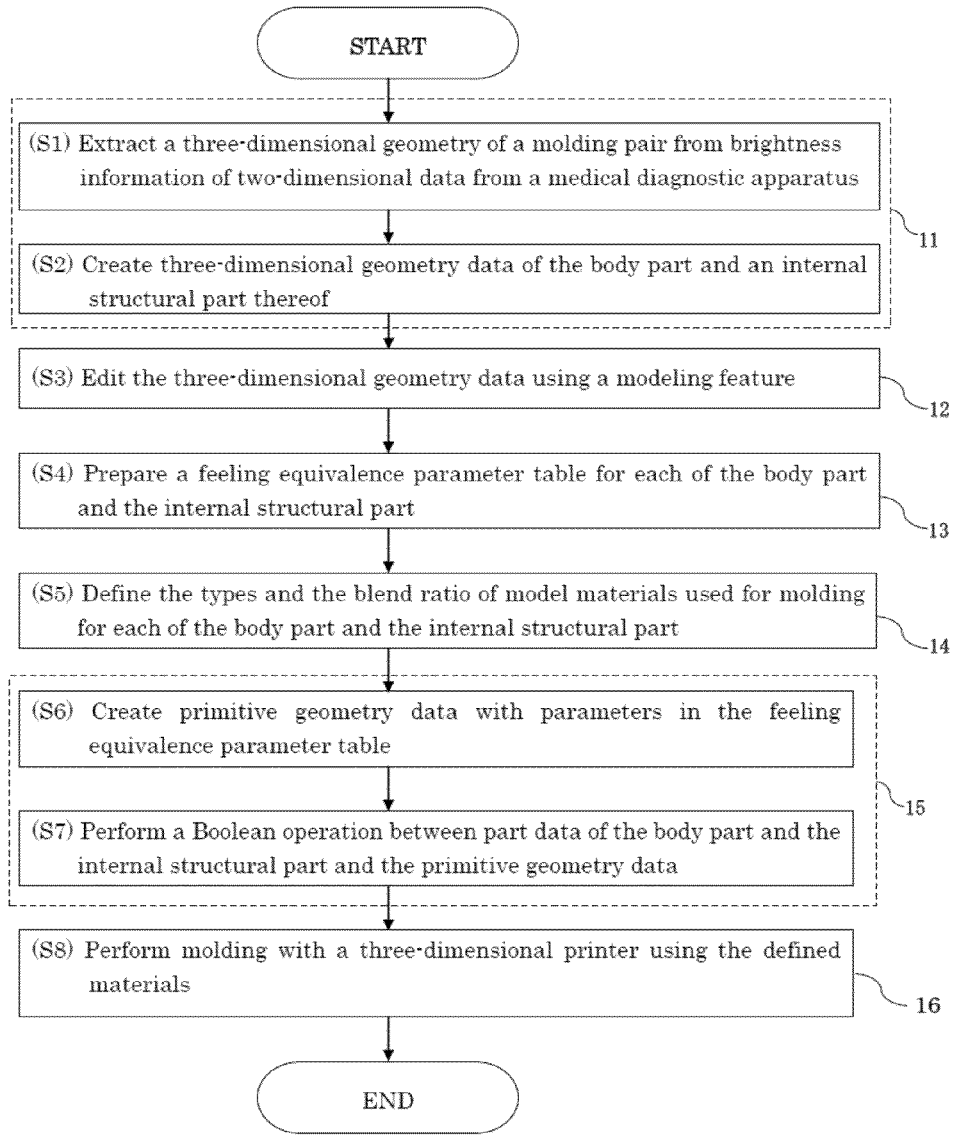
FIG. 1 shows a flow of a method for producing a three-dimensional molded model according to the present invention.

FIG. 1 shows a flow of a method for producing a three-dimensional molded model according to the present invention. As shown in FIG. 1, the method for producing a three-dimensional molded model according to the present invention performs S1 to S8 in the following steps 1 to 6. In this flow, S2 and S3 are performed to configure a visualization setting of a three-dimensional geometry and S4 to S7 are performed to configure a feeling equivalence setting.

<Step 1: Geometry Data Creating Step 11>
(S1) Extract a Three-Dimensional Geometry of a Molding Pair from Brightness Information of Two-Dimensional Data from a Medical Diagnostic Apparatus.

Dot information of tomographic images including DICOM-format brightness information is obtained from a CT or an MRI apparatus and the tomographic images are overlaid to extract a three-dimensional geometry of a body part to be molded.

(S2) Create Three-Dimensional Geometry Data of the Body Part and an Internal Structural Part Thereof.

Three-dimensional geometry data of the body part and the internal structural part thereof created using commercially-available three-dimensional image CAD software undergoes adjustment of the patch surface orientation, removal of unnecessary shells, supplement of gaps, patch reduction, and smoothing processing of the contour geometry or the like to be in the STL data format.

<Step 2: Geometry Data Editing Step 12>
(S3) Edit the Three-Dimensional Geometry Data Using a Modeling feature.

Using commercially-available three-dimensional image CAD software, a character/sign is added to thereby add a patient's personal information and/or imaging date or the like to the three-dimensional geometry data as character information. A marking symbol is added to thereby add information useful for decision on courses of treatment or the like to the three-dimensional geometry data. A scaler is added to thereby add information useful for actual operations to the three-dimensional geometry data. A barcode is added to thereby add a patient's information to the three-dimensional geometry data.

<Step 3: Table Preparing Step 13>
(S4) Prepare a Feeling Equivalence Parameter Table for Each of the Body Part and the Internal Structural Part.

Using commercially-available table building software, a feeling equivalence parameter table is prepared. The feeling equivalence parameter table defines an internal structure pattern, a pattern size, and a pattern interval that specify a primitive geometry. Some internal structure patterns are arranged in advance and selected by a user with, for example, the pattern number.

<Step 4: Material Type Defining Step 14>
(S5) Define the Types and the Blend Ratio of Model Materials Used for Molding for Each of the Body Part and the Internal Structural Part.

The model materials are selectable from a variety of resins, if used as an example, with which parameters can be controlled, such as color, optical transparency, high softness, radiotransparency, ultrasonic sensitivity, scintillation sensitivity, heat ray sensitivity, and conductivity. Support materials may also be used as model materials for molding.

If it is possible to simultaneously form jets of two types of resins as model materials, two resins are selected as the model materials and the blend ratio is defined (e.g. (resin A):(resin B)=1:3).

<Step 5: Boolean Operation Step 15>
(S6) Create Primitive Geometry Data with Parameters in the Feeling Equivalence Parameter Table.

A primitive geometry is defined based on the feeling equivalence parameter table information. The primitive geometry may be formed of a model material, formed not of a model material but of a support material, or may be subtracted from a model material by removing a support material.

(S7) Perform a Boolean Operation Between Part Data of the Body Part and the Internal Structural Part and the Primitive Geometry Data.

A primitive geometry is added or subtracted to/from part data formed of a model material or a support material.

<Step 6: Molding Step 16>
(S8) Perform Molding with a Three-Dimensional Printer Using the Defined Materials.

Using a commercially-available three-dimensional printer, the three-dimensional molded model is produced. For example, a three-dimensional printer of OBJET Ltd. may be used. The intended three-dimensional molded model is molded with such a three-dimensional printer using the three-dimensional geometry data of the internal structures of the model and the defined materials.

Embodiment 1

Figure 2:
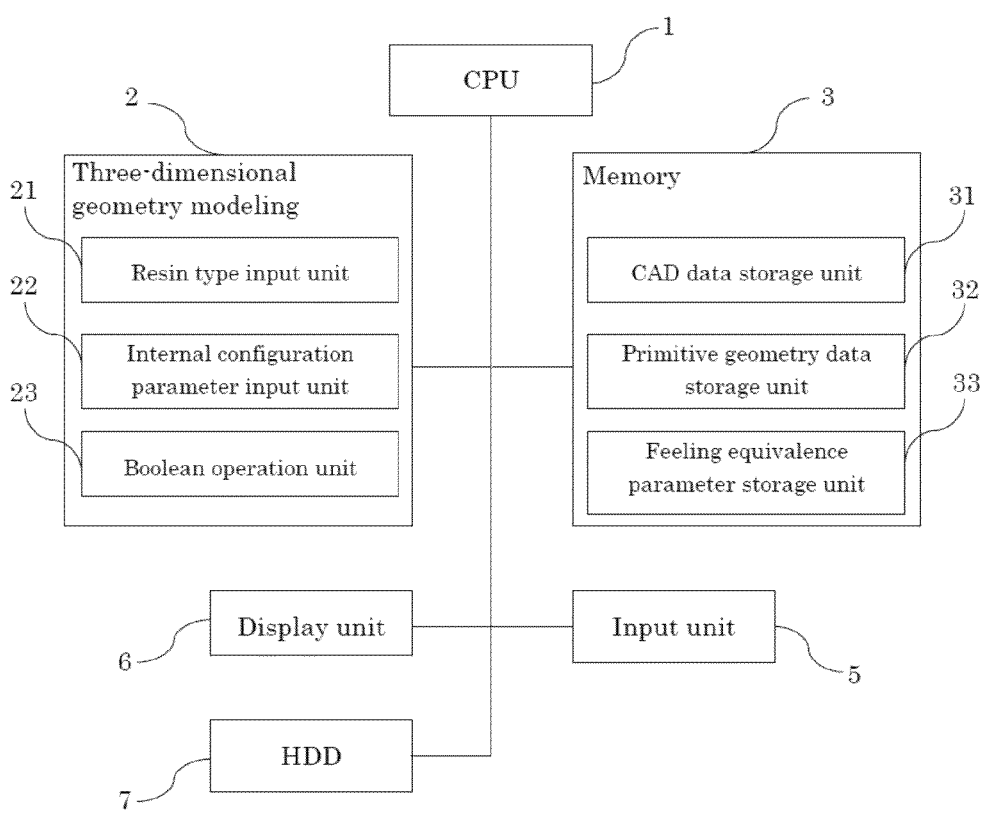
FIG. 2 shows a configuration of an apparatus for producing a three-dimensional molded model according to a first embodiment.

FIG. 2 shows a configuration of an apparatus for producing a three-dimensional molded model according to a first embodiment. As shown in FIG. 2, the apparatus for producing a three-dimensional molded model is a common computer including a CPU 1, a memory 3, a display unit 6, an input unit 5, and a HDD 7. Specifically, the input unit 5 includes a keyboard and a mouse, and the display unit 6 includes a liquid-crystal display. The memory 3 is used for data storage, including a CAD data storage unit 31 for storing three-dimensional geometry data and the like, a primitive geometry data storage unit 32 used for Boolean operations, and a feeling equivalence parameter storage unit 33. The three-dimensional geometry modeling 2 is a program itself that the computer reads from the HDD 7 onto the memory 3 and runs.

The three-dimensional geometry modeling 2 includes a resin type input unit 21 for prompting a user to input the type of resin through the display unit 6, an internal configuration parameter input unit 22 for prompting an input of an internal configuration parameter included in a feeling equivalence parameter table, and a Boolean operation unit 23 for performing a Boolean operation.

Figure 3:
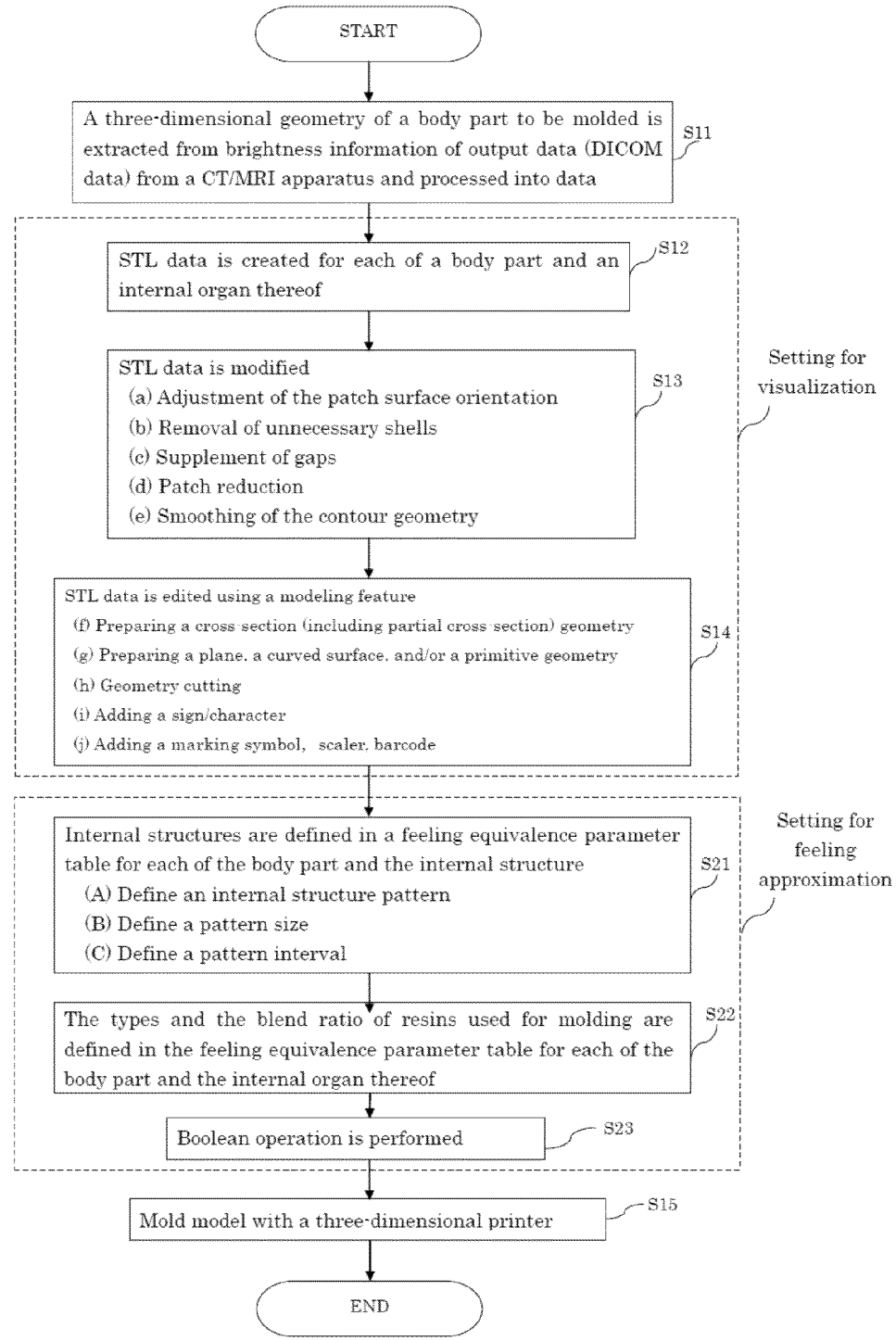
FIG. 3 shows a flow of a method for producing a three-dimensional molded model according to the first embodiment.

FIG. 3 shows a flow of a method for producing a three-dimensional molded model according to the first embodiment.

As shown in FIG. 3, the flow of the method for producing a three-dimensional molded model includes two stages of setting for visualization (S12 to S14) and feeling approximation (S21 to S23) that are performed in parallel.

First, a three-dimensional geometry of a body part to be molded is extracted from brightness information of output data (DICOM data) from a CT/MRI apparatus and processed into data (S11). As a setting for visualization, STL data is then created for each of a body part and an internal organ thereof (S12). The STL data is modified (S13). The STL data is edited using a modeling feature (S14). In the flow shown in FIG. 3, the steps S13 and S14 are both performed. It is noted that the step S13 may be omitted to only perform the step S14.

As a setting for feeling approximation, an internal structure pattern, a pattern size, and a pattern interval are defined in a feeling equivalence parameter table for each of the body part and the internal structure (S21). The types and the blend ratio of resins used for molding are defined in the feeling equivalence parameter table for each of the body part and the internal organ thereof (S22).

After the settings for visualization and feeling approximation, a Boolean operation is performed (S23). Three-dimensional geometry data after the Boolean operation is sent to a three-dimensional printer to mold a three-dimensional model (S15).

Figure 4:
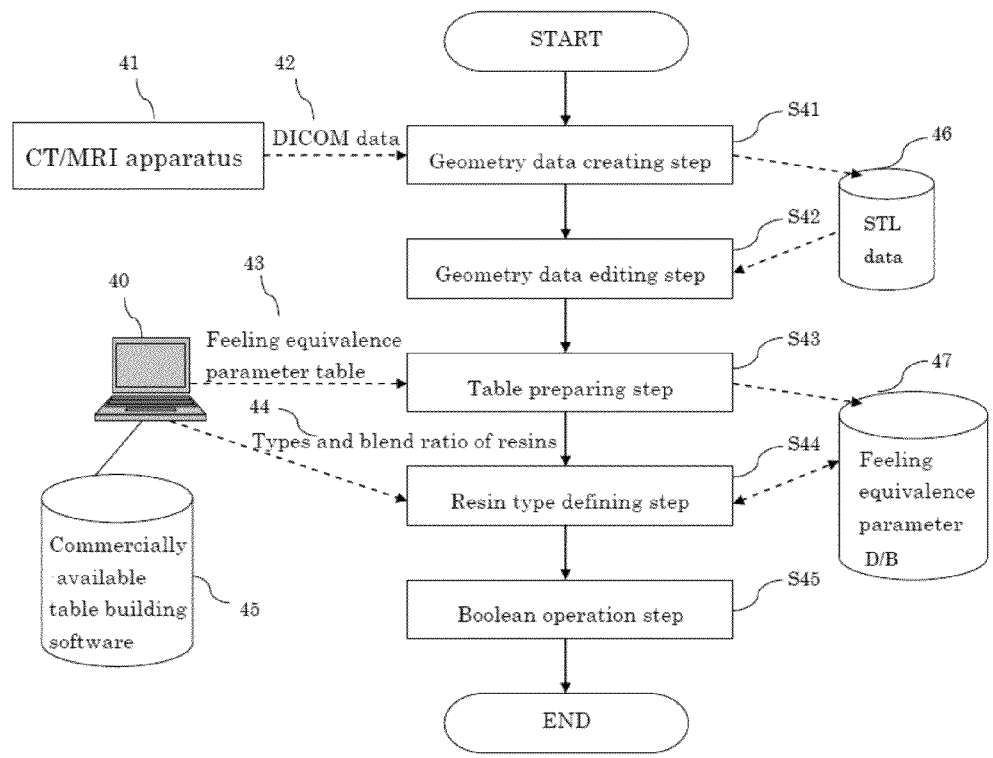
FIG. 4 illustrates a processing flow of a program that runs on the apparatus for producing a three-dimensional molded model according to the first embodiment.

FIG. 4 illustrates a processing flow of a program that runs on the apparatus for producing a three-dimensional molded model according to the first embodiment.

DICOM data 42 is retrieved from a CT or an MRI apparatus (CT/MRI apparatus 41). The data is stored in the HDD in the computer as an STL data file in the geometry data creating step (S41). The STL data is read using commercially-available three-dimensional geometry software and edited using a modeling feature or the like (geometry data editing step: S42).

Following or in parallel with these steps, a feeling equivalence parameter table is prepared in the computer using commercially-available table building software 45 (table preparing step: S43). The types and the blend ratio of resins are input as a table (resin type defining step: S44). A feeling equivalence parameter database (D/B) is thus created through the steps S43 and S44. The intended three-dimensional molded model is then produced in the Boolean operation step S45.

Figure 5:
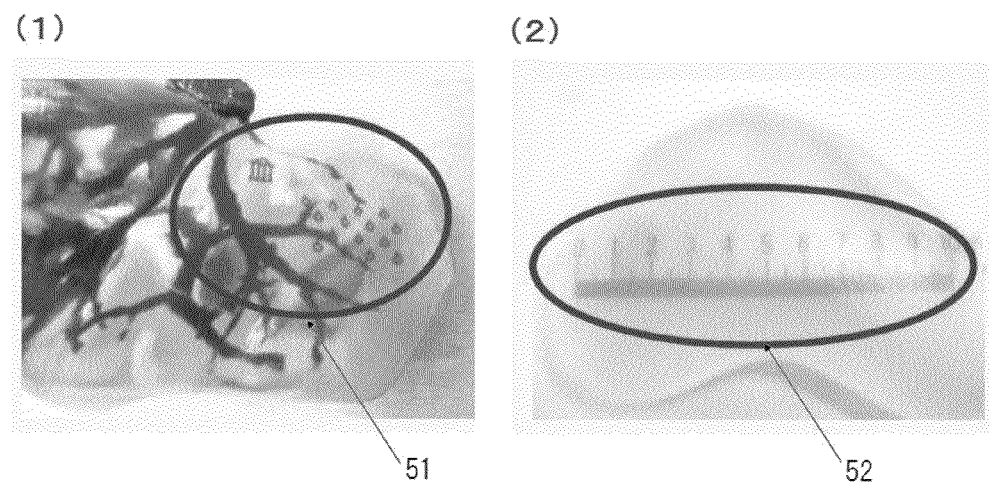
FIG. 5 shows an exemplary three-dimensional molded model.

FIG. 5 shows an exemplary three-dimensional molded model. FIG. 5(1) is a partially enlarged view of the three-dimensional molded model of a liver. A standard character/symbol 51 including a patient's information is drawn. FIG. 5(2) shows a state where a scaler 52 is embedded in the three-dimensional molded model. In addition to the dimension indication with a scaler, barcode information may also be embedded.

FIG. 6 illustrates feeling equivalence parameter tables of three-dimensional molded models of a liver. FIG. 6(1) is a table showing exemplary internal configuration parameters required for a three-dimensional molded model of a normal liver. FIG. 6(2) is a table showing exemplary internal configuration parameters required for a three-dimensional molded model of a liver cross-section. FIG. 6(3) is a table showing exemplary internal configuration parameters required for a three-dimensional molded model of a liver cancer.

The table of FIG. 6(1) shows that using two types of resins A and B, hepatic parenchyma, hepatic vein, and portal vein are formed into a three-dimensional molded model as a liver internal structure. Hepatic parenchyma, hepatic vein, and portal vein are molded of the resin A or B or a blend of the resins A and B. Specifically, hepatic parenchyma is molded of the resin A (at a blend ratio of 1:0 (resin A:B)), hepatic vein is molded of the resin B (at a blend ratio of 0:1 (resin A:B)), and portal vein is molded of a composite resin having a blend ratio of 3:1 (resin A:B). A liver model can be produced by performing a Boolean operation of logical sum of the three-dimensional geometries of hepatic parenchyma, hepatic vein, and portal vein.

As shown in FIG. 6(1), each internal structure has an internal structure pattern, a pattern size, and a pattern interval as parameters. For example, hepatic parenchyma has an internal structure pattern in which cubes with sides of 1.5 mm exist at intervals of 0.5 mm. A Boolean operation of logical sum or logical difference between the internal structure pattern and the three-dimensional geometry of hepatic parenchyma produces a model providing a feeling of touch approximate to that of the actual object. In the case of a Boolean operation of logical sum, a model material is used as the resin for the internal structure pattern. In the case of a Boolean operation of logical difference, a support material is used as the resin for the internal structure pattern.

The table of FIG. 6(2) includes the same information as that in the table of FIG. 6(1). FIG. 6(2) is for a three-dimensional molded model of a liver cross-section, with which the internal structure can be observed in detail through the cross-section. Respective molded models of the internal structure, which are exposed to outside through the cross-section, are all molded of model materials. Molding using, for example, a support material is not allowed.

The table of FIG. 6(3) includes information of a cancer part as an affected part, in addition to the information included in the table of FIG. 6(1). The table of FIG. 6(3) shows that a support material is used for the cancer part. The cancer part, which is entirely surrounded by hepatic parenchyma, can be molded using a support material.

Figure 8:
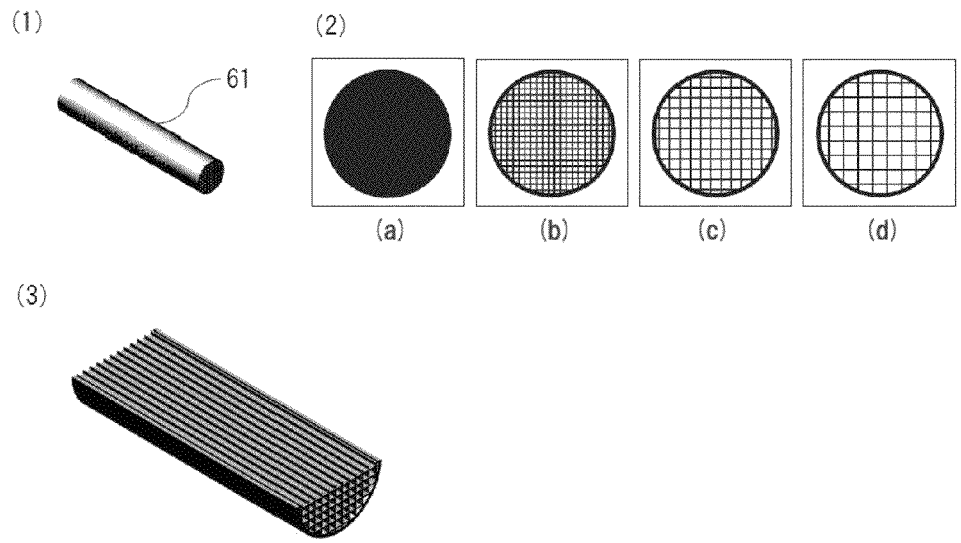
FIG. 8 shows exemplary three-dimensional molded models of a bone.
Figure 9:
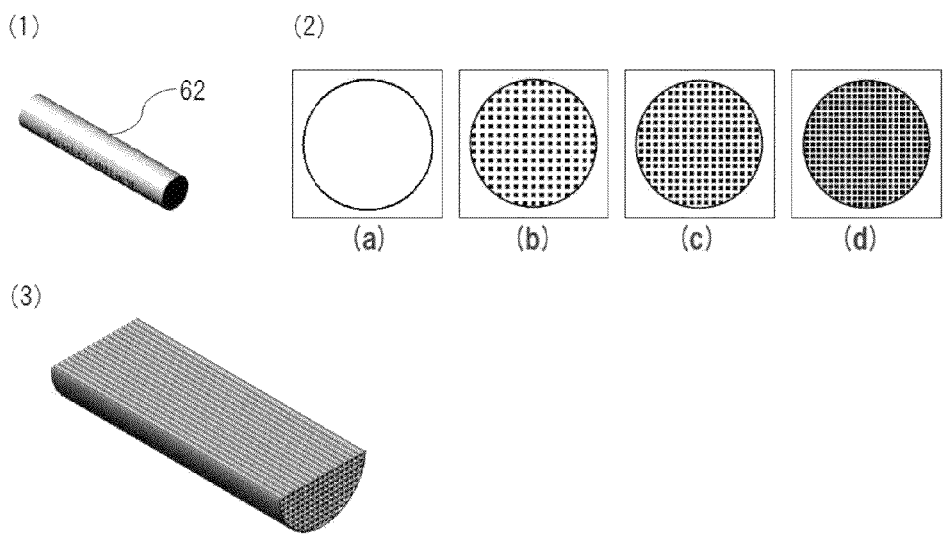
FIG. 9 shows exemplary three-dimensional molded models of a muscle.

FIG. 7 illustrates feeling equivalence parameter tables of three-dimensional molded models of a bone. FIGS. 8 and 9 show exemplary three-dimensional molded models of a bone and a muscle, respectively.

FIG. 7(1)(a) is an image of a molded model of a normal bone. FIG. 7(1)(b) is an exemplary feeling equivalence parameter table of the molded model of the normal bone. FIG. 7(1)(b) shows that a cube of a primitive geometry is defined as an internal structure pattern. The pattern size is 1.5 mm and the pattern interval is 1 mm. A resin is used having a blend ratio of 1:1 (resin A:B).

In this case, the geometry of the bone itself as a body part is formed of a resin having a blend ratio of 1:1 (resin A:B) and a logical difference is performed with the cube of the primitive geometry to subtract the cube and thereby to produce a molded model providing a feeling of touch equivalent to the hardness of the bone. Here, the pattern size is equal to the length of the sides of the cube. The pattern interval is equal to the distance between the side surfaces of the cube.

FIG. 7(2)(c) is an image of a molded model of an osteoporotic bone. FIG. 7(2)(d) is an exemplary feeling equivalence parameter table of the molded model of the osteoporotic bone. FIG. 7(2)(d) shows that a cube of a primitive geometry is defined as an internal structure pattern. The pattern size is 4 mm and the pattern interval is 0.5 mm. A resin is used having a blend ratio of 1:1 (resin A:B).

In this case, the geometry of the bone itself as a body part is formed of a resin having a blend ratio of 1:1 (resin A:B) and a logical difference is performed with the cube of the primitive geometry to subtract the cube and thereby to produce a molded model providing a feeling of touch equivalent to the hardness of the bone. Here, the pattern size is equal to the length of the sides of the cube. The pattern interval is equal to the distance between the side surfaces of the cube.

Compared to the molded model of the normal bone, the molded model of the osteoporotic bone undergoes primitive geometry subtraction of a larger volume and has a larger gap to adjust the hardness.

FIG. 8 shows cross-sections perpendicular to the longitudinal direction of a bone model 61 (FIG. 8(2)) and a schematic view of an internal structure (FIG. 8(3)). The cross-sections of the bone model 61 include a cross-section formed only with a resin C (FIG. 8(2)(a)) and cross-sections after a logical difference with different primitive geometry sizes (FIG. 8(2)(b) to (d)). In this case, if the primitive geometry is defined with no material, a support material is to be used for molding and to be subtracted after the model material is hardened, that is, to be subtracted by the size of the primitive geometry. Accordingly, the hardness of the bone model reduces with the change from FIG. 8(2)(a) to FIG. 8(2)(d).

FIG. 9 shows cross-sections perpendicular to the longitudinal direction of a muscle model 62 (FIG. 9(2)) and a schematic view of an internal structure (FIG. 9(3)). The cross-sections of the muscle model 62 include a cross-section formed only with a support material (FIG. 9(2)(a)) and cross-sections after a logical sum with different pattern intervals of a primitive geometry formed of a resin C harder than the support material (FIG. 9(2)(b) to (d)). FIG. 9(2)(a) shows the highest flexibility, and the number of structure patterns of the primitive geometry increases and thereby the hardness of the muscle model also increases with the change from FIG. 9(2)(b) to FIG. 9(2)(d).

Figure 10:
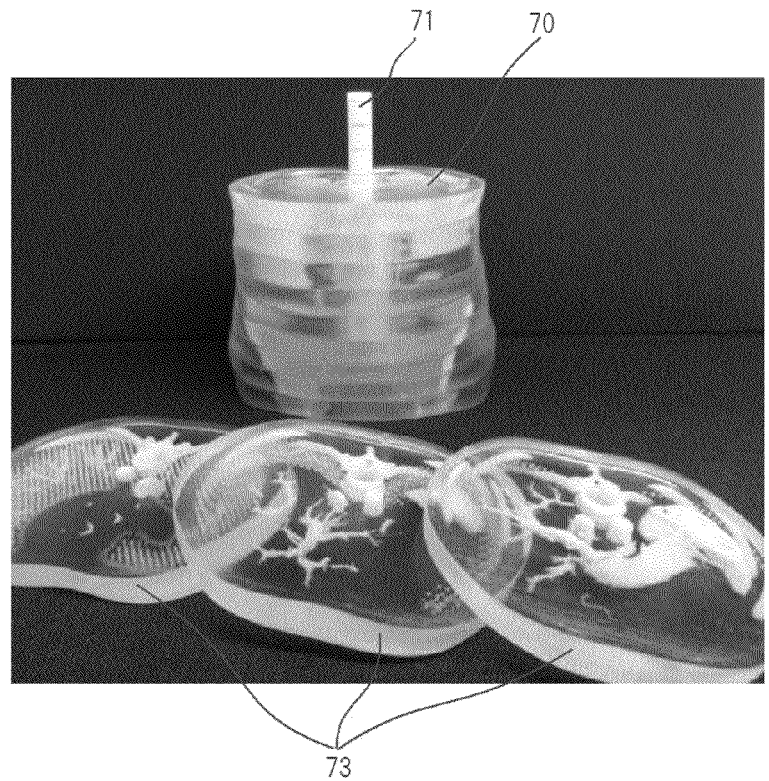
FIG. 10 is an external view of a support tool for medical treatment, medical training, research, and education.

FIG. 10 is an external view of a support tool for medical treatment, medical training, research, and education, showing slices 73 with a predetermined thickness of a three-dimensional molded model from the waist to bust line of a body obtained by the method for producing a three-dimensional molded model according to the present invention. Cross-sections of the backbone and the lungs can be observed. These slices are overlaid 70 to form the original three-dimensional geometry, and an axis 71 corresponding to the backbone is passed through the geometry so that the geometry is freely rotatable about the axis 71. This allows the entire geometry and the cross-section structure to be grasped at the same time, which is useful as a tool for medical care support and medical education.

Figure 11:
FIG. 11 is an external view of a liver model.

FIG. 11 is an external view of a liver model. The whole of the geometry is hepatic parenchyma 80 formed of a translucent resin. Internal structures such as a hepatic vein can be observed inside the hepatic parenchyma 80. A soft translucent resin is used as a model material for the hepatic parenchyma 80 and, according to feeling equivalence parameters, an internal structure pattern is further provided inside the hepatic parenchyma 80 so that the hepatic parenchyma 80 provides a feeling of touch approximate to that of the actual object.

Figure 12:
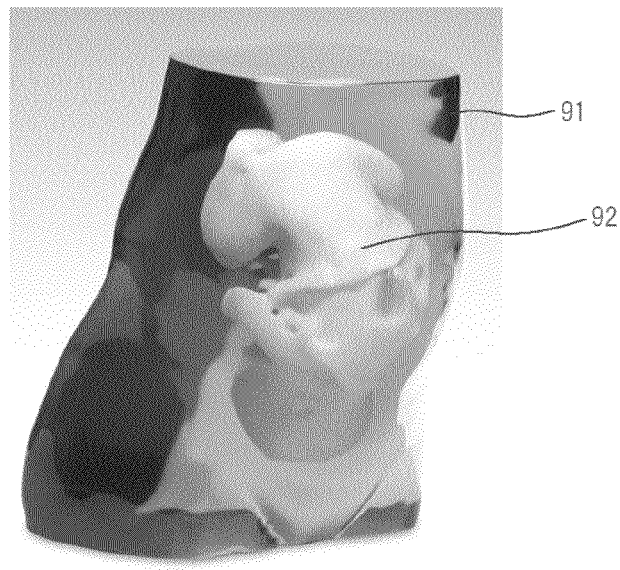
FIG. 12 is an external view of a pregnant abdomen model (1).

FIG. 12 is an external view of a pregnant abdomen model. The whole of the geometry is a cut-out pregnant abdomen 91 formed of a translucent resin. According to this model, the pregnant abdomen 91 and a fetus 92 therein can be observed. The shape, size, direction, limbs, and positional relationship in the geometry of the abdomen of the fetus can be identified at a glance.

A soft translucent resin is used as a model material for the pregnant abdomen 91 and, according to feeling equivalence parameters, an internal structure pattern is further provided inside the pregnant abdomen 91 so that the pregnant abdomen 91 provides a feeling of touch approximate to that of the actual object. Similarly, according to feeling equivalence parameters, an internal structure pattern is also provided inside the fetus 92 so that the fetus 92 provides a feeling of touch approximate to that of the actual object.

Figure 13:
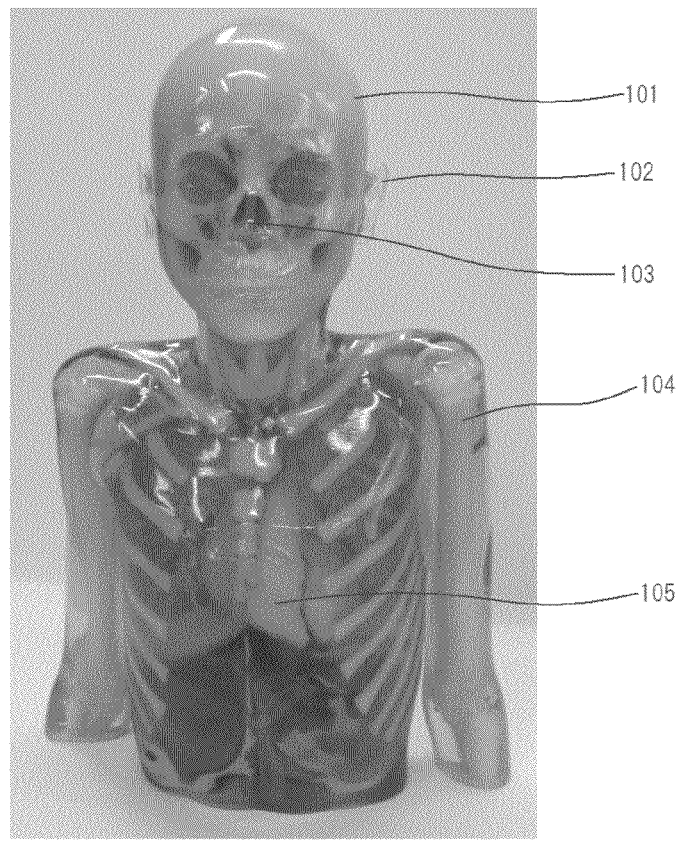
FIG. 13 is external views of a face and upper body model (2).
Figure 14:
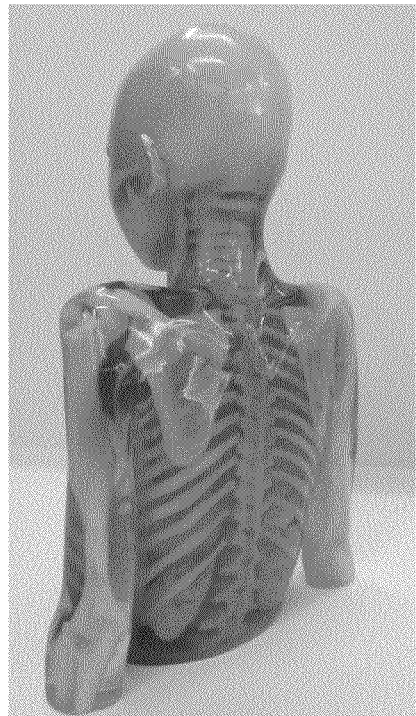
FIG. 14 is external views of a face and upper body model.

FIGS. 13 and 14 are external views of a face and upper body model. The reference symbol 101 denotes a skull, 102 denotes an ear cartilage, 103 denotes a nose cartilage, 104 denotes a humerus, and 105 denotes a heart. In addition, ribs, breastbones, other bones, teeth, lungs, etc., can be observed. From the head to the upper body and the upper arms, the entire skin and the ear and nose cartilages are molded of a transparent resin. Internal structures including the skull, ribs, breastbones, and other bones are molded of a hard resin. The heart is molded of a soft resin. According to respective feeling equivalence parameters, an internal structure pattern is provided inside each of the molded models so that the molded model provides a feeling of touch approximate to that of the actual object.

Figure 15:
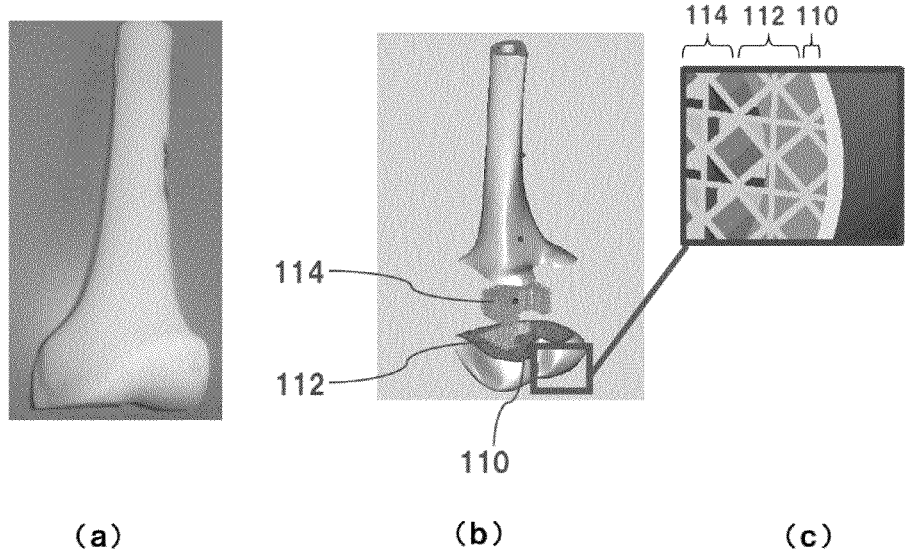
FIG. 15 illustrates a bone model.

FIG. 15 illustrates a bone model. The bone model shown in FIG. 15 has an internal structure including a cortical bone 110 as a surficial portion of a bone and a cancellous bone (112, 114) as an interior portion. The cancellous bone includes a surficial portion 112 (adjacent to the cortical bone and having a predetermined thickness) and an interior portion 114. The cortical bone 110 is molded of a hard resin. According to feeling equivalence parameters, an internal structure pattern is provided inside the cortical bone 110 so that the cortical bone 110 provides feeling of hardness approximate to that of the actual object. The surficial portion 112 of the cancellous bone has a hardness slightly different from that of the cortical bone 110. According to feeling equivalence parameters, an internal structure pattern is provided inside the surficial portion 112 of the cancellous bone different from that inside the cortical bone 110 so that the difference in the hardness approximates that of the actual object. The interior portion 114 of the cancellous bone is most brittle and, according to feeling equivalence parameters, an internal structure pattern is provided so that the brittleness approximates that of the actual object. As shown in FIG. 15(b), the interior portion 114 of the cancellous bone has a grid-like structure in which the primitive geometry of the internal structure pattern is removed.

In collaboration with a medical school hospital, the effectiveness of using a three-dimensional molded model produced according to the present invention is currently verified on, for example, a reduction in time for procedures in medical practices. As for an implant junction procedure for fractured pelvis, results of about five exemplary evaluations have shown that the time required for the procedure, which is commonly 6 to 7 hours, can be reduced to 5 to 6 hours (i.e. by 1 hour). A reduction in time for procedures is expected to reduce the burden on patients and also hasten postoperative recovery. In the future, three-dimensional molded models produced according to the present invention will be utilized in various medical practices.

INDUSTRIAL APPLICABILITY

Three-dimensional molded models produced according to the present invention are useful for informed consent, decision on courses of treatment, and medical care support, and also as support tools for medical education, medical research, and general education, and further as teaching materials for anatomy and surgery because such models can simulate the feeling of touch. For example, models of a blood vessel and a parenchyma organ molded of a rubber-like soft resin are useful not only as support tools with which a three-dimensional dissection can be taken in hand to understand, but also as simulators most suitable for arthroscopy procedure training when installed in a laparoscopic surgery training box.

DESCRIPTION OF SYMBOLS

11 Geometry data creating step
12 Geometry data editing step
13 Table preparing step
14 Material type defining step
15 Boolean operation step
16 Molding step 51 Standard character/symbol
52 Scaler
61 Bone model
62 Muscle model
70 Overlaid
71 Axis
73 Slices with a predetermined thickness
80 Hepatic parenchyma
91 Pregnant abdomen
92 Fetus
101 Skull
102 Ear cartilage
103 Nose cartilage
104 Humerus
105 Heart
110 Cortical bone
112 Cancellous bone as a surficial portion
114 Cancellous bone as an interior portion

What is claimed is:

1. A method for producing a three-dimensional molded model using a three-dimensional printer that uses at least two types of materials as model materials, the method comprising at least the steps of:
  1) extracting a three-dimensional geometry of a body part to be molded from brightness information of two-dimensional data obtained from a medical diagnostic apparatus and creating three-dimensional geometry data of the body part and an internal structural part thereof;
  2) editing the three-dimensional geometry data of the body part and the internal structural part thereof using a modeling feature;
  3) preparing a feeling equivalence parameter table including, as parameters, at least an internal structure pattern, a pattern size, and a pattern interval that specify a primitive geometry of the body part and the internal structural part;
  4) defining types and a blend ratio of model materials used for molding for each of the body part and the internal structural part and adding the types and the blend ratio to the feeling equivalence parameter table;
  5) creating primitive geometry data with parameters in the feeling equivalence parameter table and performing a Boolean operation of either logical sum, logical difference, or logical product between part data of the body part and the internal structural part obtained in the preceding step 2) and the primitive geometry data; and
  6) performing molding with the three-dimensional printer using the materials defined in the preceding step 4) based on the three-dimensional geometry data of the body part and the internal structural part obtained in the preceding step 5).

2. The method for producing a three-dimensional molded model according to claim 1, wherein at least one type of the model materials is composed of a translucent material.

3. The method for producing a three-dimensional molded model according to claim 1, wherein the step 2) includes at least one of character/sign addition processing, marking symbol addition processing, scaler addition processing, and barcode addition processing.

4. The method for producing a three-dimensional molded model according to claim 1, wherein the step 1) includes reducing the three-dimensional geometry size of the internal structural part to be smaller than a volume of the internal structural part of the body part.

5. The method for producing a three-dimensional molded model according to claim 1, wherein in the case of providing a feeling of softness for at least one of the body part and the internal structural part, the step 5) includes:
  performing a logical sum between the part data defined with a first soft material and the primitive geometry data defined with a second soft material; or
  performing a logical difference between the part data defined with a first soft material and the primitive geometry data defined with no material.

6. The method for producing a three-dimensional molded model according to claim 1, wherein in the case of providing a feeling of hardness for at least one of the body part and the internal structural part, the step 5) includes:
  performing a logical sum between the part data defined with a first hard material and the primitive geometry data defined with a second hard material; or
  performing a logical difference between the part data defined with a first hard material and the primitive geometry data defined with no material.

7. The method for producing a three-dimensional molded model according to claim 1, wherein in the case of providing a feeling of hardness for at least one of the body part and the internal structural part, the step 5) includes performing a logical sum or a logical difference between the part data defined with a first hard material and the primitive geometry data defined with a first soft material.

8. The method for producing a three-dimensional molded model according to claim 1, wherein in the step 3), if the body part is a liver, one or more of hepatic parenchyma, hepatic vein, portal vein, bile duct, and an affected part are selected as the internal structural part to define the internal structure pattern, the pattern size, and the pattern interval thereon.

9. The method for producing a three-dimensional molded model according to claim 1, wherein in the step 3), if the body part is a pregnant abdomen, one or more of uterus, fetus, umbilical cord (navel cord), placenta, amniotic fluid, blood vessel, and subcutaneous fat are selected as the internal structural part to define the internal structure pattern, the pattern size, and the pattern interval thereon.

10. The method for producing a three-dimensional molded model according to claim 1, wherein in the step 3), if the body part is a breast, one or more of subcutaneous fat, mammary gland, mammary duct, lymph duct, lymph node, and breast cancer part are selected as the internal structural part to define the internal structure pattern, the pattern size, and the pattern interval thereon.

11. The method for producing a three-dimensional molded model according to claim 1, wherein in the step 3), if the body part is a limb, one or more of skin, subcutaneous fat, artery, vein, muscle, bone, and tendon forming the limb and joints are selected as the internal structural part to define the internal structure pattern, the pattern size, and the pattern interval thereon.

12. The method for producing a three-dimensional molded model according to claim 1, wherein in the step 3), if the body part is a throat, one or more of esophagus, trachea, and cartilage are selected as the internal structural part to define the internal structure pattern, the pattern size, and the pattern interval thereon.

13. The method for producing a three-dimensional molded model according to claim 1, wherein in the step 3), if the body part is a face, one or more of skin, subcutaneous fat, muscle, cartilage, bone, and blood vessel are selected as the internal structural part to define the internal structure pattern, the pattern size, and the pattern interval thereon.

14. The method for producing a three-dimensional molded model according to claim 1, wherein in the step 3), if the body part is a tooth and gum, one or more of tooth, gum, alveolar bone, blood vessel, nerve, jaw bone, jaw muscle, and tongue are selected as the internal structural part to define the internal structure pattern, the pattern size, and the pattern interval thereon.

15. The method for producing a three-dimensional molded model according to claim 1, wherein in the step 3), if the body part is a digestive tract, the inner wall or the outer wall of the digestive tract is selected as the internal structural part to define the internal structure pattern, the pattern size, and the pattern interval thereon.

16. The method for producing a three-dimensional molded model according to claim 1, wherein in the step 3), if the body part is a head, one or more of hair, eyeball, brain, brain blood vessel, skin, subcutaneous fat, muscle, ear cartilage, nose cartilage, and skull are selected as the internal structural part to define the internal structure pattern, the pattern size, and the pattern interval thereon.

17. A support tool for medical treatment, medical training, research, and education, the support tool formed by slicing at a predetermined thickness a three-dimensional molded model obtained by at least the steps of:
   1) extracting a three-dimensional geometry of a body part to be molded from brightness information of two-dimensional data obtained from a medical diagnostic apparatus and creating three-dimensional geometry data of the body part and an internal structural part thereof;
   2) editing the three-dimensional geometry data of the body part and the internal structural part thereof using a modeling feature;
   3) preparing a feeling equivalence parameter table including, as parameters, at least an internal structure pattern, a pattern size, and a pattern interval that specify a primitive geometry of the body part and the internal structural part;
   4) defining types and a blend ratio of model materials used for molding for each of the body part and the internal structural part and adding the types and the blend ratio to the feeling equivalence parameter table;
   5) creating primitive geometry data with parameters in the feeling equivalence parameter table and performing a Boolean operation of either logical sum, logical difference, or logical product between part data of the body part and the internal structural part obtained in the preceding step 2) and the primitive geometry data; and
   6) performing molding with the three-dimensional printer using the materials defined in the preceding step 4) based on the three-dimensional geometry data of the body part and the internal structural part obtained in the preceding step 5).

18. The support tool according to claim 17 for medical treatment, medical training, research, and education, the support tool also formed by overlaying the slices to form the original three-dimensional geometry, and passing an axis through the geometry so that the geometry is freely rotatable about the axis.

19. A support tool for medical treatment, medical training, research, and education, the support tool formed by slicing at a predetermined thickness a three-dimensional molded model obtained by a method for producing a three-dimensional molded model using a three-dimensional printer that uses at least two types of materials as model materials, overlaying the slices to form the original three-dimensional geometry, and passing an axis through the geometry so that the geometry is freely rotatable about the axis,
   the method comprising the steps of:
   extracting a three-dimensional geometry of a body part to be molded from brightness information of two-dimensional data obtained from a medical diagnostic apparatus and creating three-dimensional geometry data of the body part and an internal structural part thereof;
   editing the three-dimensional geometry data using a modeling feature;
   defining types and a blend ratio of model materials used for molding for each of the body part and the internal structural part and adding the types and the blend ratio to a feeling equivalence parameter table; and
   performing molding with the three-dimensional printer using the materials defined in the preceding step of defining the material types.

20. A computer comprising a central processing unit (CPU), a memory, and a hard disk drive (HDD), the computer storing a program for producing a three-dimensional molded model using a three-dimensional printer that uses at least two types of materials as model materials, the program causing the computer to execute the steps of:
   extracting a three-dimensional geometry of a body part to be molded from brightness information of two-dimensional data obtained from a medical diagnostic apparatus and creating three-dimensional geometry data of the body part and an internal structural part thereof;
   editing the three-dimensional geometry data using a modeling feature;
   prompting an input of feeling equivalence parameters including at least an internal structure pattern, a pattern size, and a pattern interval that specify a primitive geometry of the body part and the internal structural part, respectively, and generating a feeling equivalence parameter table;
   prompting an input of types and a blend ratio of model materials used for molding for each of the body part and the internal structural part and additionally defining the types and the blend ratio to the feeling equivalence parameter table; and
   creating primitive geometry data with parameters in the feeling equivalence parameter table and performing a Boolean operation of either logical sum, logical difference, or logical product between part data of the body part and the internal structural part obtained in the preceding step of editing data and the primitive geometry data.

* * * * *